July 9, 1968

C. F. FIGG 3,392,328

METHOD AND APPARATUS FOR TESTING STORAGE BATTERIES
UTILIZING OPEN CIRCUIT VOLTAGES AFTER DISCHARGE
AND CHARGE

Filed March 16, 1965

INVENTOR.
Chester F. Figg
BY
C. R. Meland
HIS ATTORNEY

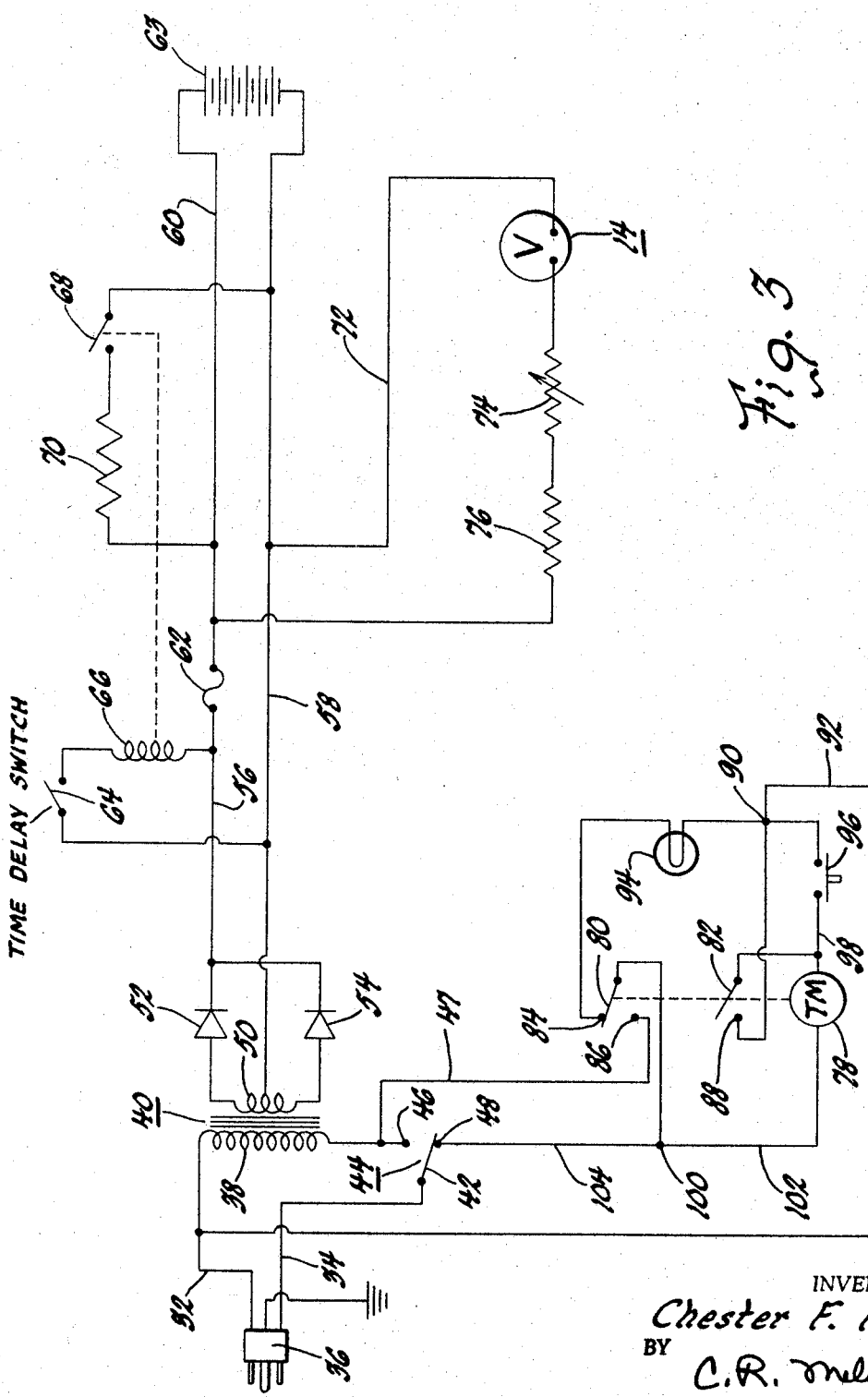

United States Patent Office 3,392,328
Patented July 9, 1968

3,392,328
METHOD AND APPARATUS FOR TESTING STORAGE BATTERIES UTILIZING OPEN CIRCUIT VOLTAGES AFTER DISCHARGE AND CHARGE
Chester F. Figg, Muncie, Ind., assignor to General Motors Corporation, Detroit, Mich., a corporation of Delaware
Filed Mar. 16, 1965, Ser. No. 440,129
6 Claims. (Cl. 324—29.5)

ABSTRACT OF THE DISCLOSURE

This invention relates to a method and apparatus for testing storage batteries. In performing the test method of this invention a storage battery is discharged for a predetermined length of time and following the discharge, the open circuit voltage is measured. The storage battery is then charged for a predetermined length of time and the open circuit voltage is measured following the charging period. The difference in open circuit voltages is compared with data taken from a number of tests on storage batteries which have been discharged and charged. The apparatus for performing the method includes a device for discharging the battery and a battery charger for charging the battery. A voltmeter is provided to check the open circuit voltages of the battery and this voltmeter includes voltage lines taken from the experimental data which is utilized to perform the test method.

---

This invention relates to a method and apparatus for testing storage batteries.

One known method of determining whether or not a battery is defective is to test the specific gravity of the battery electrolyte. Although this test in some instances will produce good results, it is in many instances inaccurate due in part to the fact that defects do not necessarily cause wide variations in specific gravity readings between cells.

Another method of testing batteries that has been used is to test the battery while it is under a high discharge load. This test is designed for use on batteries which are in a rather high state of charge. If a battery is not at or above a certain state of charge, it must be charged before it can be tested by this method. The disadvantage of this method is that most batteries must be charged before being tested and even when this is done, a good discharged battery can sometimes be condemned as a defective battery. On the other hand, if a battery is in a low state of charge before being tested, charging the battery for test purposes may mask defects in the battery so that they will not be detected when tested under a high rate discharge test.

In contrast to the above-mentioned methods of testing storage batteries, it is an object of this invention to provide a method and apparatus for testing batteries which is based on a differential analysis of open-circuit terminal voltages of the battery. It is advantageous to use the open circuit voltage test since this characteristic of a battery is the least effected by temperature, ampere-hour capacity and state of charge. In carrying this object forward, a battery to be tested is first discharged for a predetermined length of time and the open circuit terminal voltage is then measured. The battery is then charged for a predetermined length of time and after a short waiting period, the open circuit terminal voltage is again measured. I have discovered that the difference in open circuit voltages can be used as a measure for determining whether or not the battery is defective.

A further object of this invention is to provide a battery tester which is capable of providing a visual indication to an operator of whether or not the battery under test is defective. In carrying this object forward, a voltmeter is provided with a properly calibrated face and during the test procedure, the pointer of the voltmeter moves over certain discrete areas of the face to indicate whether or not the battery is defective.

Still another object of this invention is to provide a battery tester wherein a voltmeter is calibrated to provide scale and index lines which are used during a test procedure to indicate whether or not a battery is defective.

Another object of this invention is to provide a method of testing a storage battery wherein a difference in open circuit voltages is used to determine whether or not the battery is defective, the open circuit voltages being measured after a discharge of the battery and then after a charging of the battery.

Further objects and advantages of the present invention will be apparent from the following description, reference being had to the accompanying drawings wherein preferred embodiments of the present invention are clearly shown.

In the drawings:

FIGURE 3 is a schematic circuit diagram of a battery tester made in accordance with this invention.

The present invention is concerned with determining whether or not a storage battery is defective by comparing the open circuit voltages of the storage battery following a predetermined discharge and following a predetermined charge.

In performing this method of testing, a battery to be tested is discharged for a predetermined length of time at a predetermined load. By way of example and not by way of limitation for a 12 volt battery, the battery can be discharged at fifty amperes for 15 seconds. Following this discharge of the battery, the voltage of the battery is permitted to stabilize by waiting approximately five seconds and the open circuit voltage of the battery is then measured. After the open circuit voltage is measured, the battery is charged, for example, for a period of time of 45 seconds. The open circuit voltage after charge and after a short waiting period is then measured and the difference in open circuit voltages can then be used to determine whether or not the battery is defective.

Figure 1:
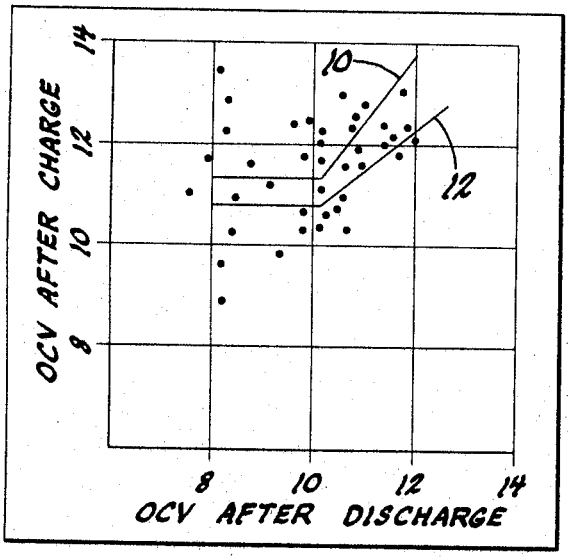
FIGURE 1 is a plot of open circuit voltage after discharge versus open circuit voltage after charge of a plurality of storage batteries.

I have discovered that if the open circuit voltage after discharge is plotted against the open circuit voltage after charge as in the plot of FIGURE 1, the defective batteries will fall outside of an area between lines 10 and 12. Thus, all of the dots between lines 10 and 12 indicate the open circuit voltage after discharge and the open circuit voltage after charge and it has been experimentally determined from a number of tests that those dots falling between the lines 10 and 12 indicate a good battery. The dots falling outside of lines 10 and 12 indicate a defective battery.

Figure 2:
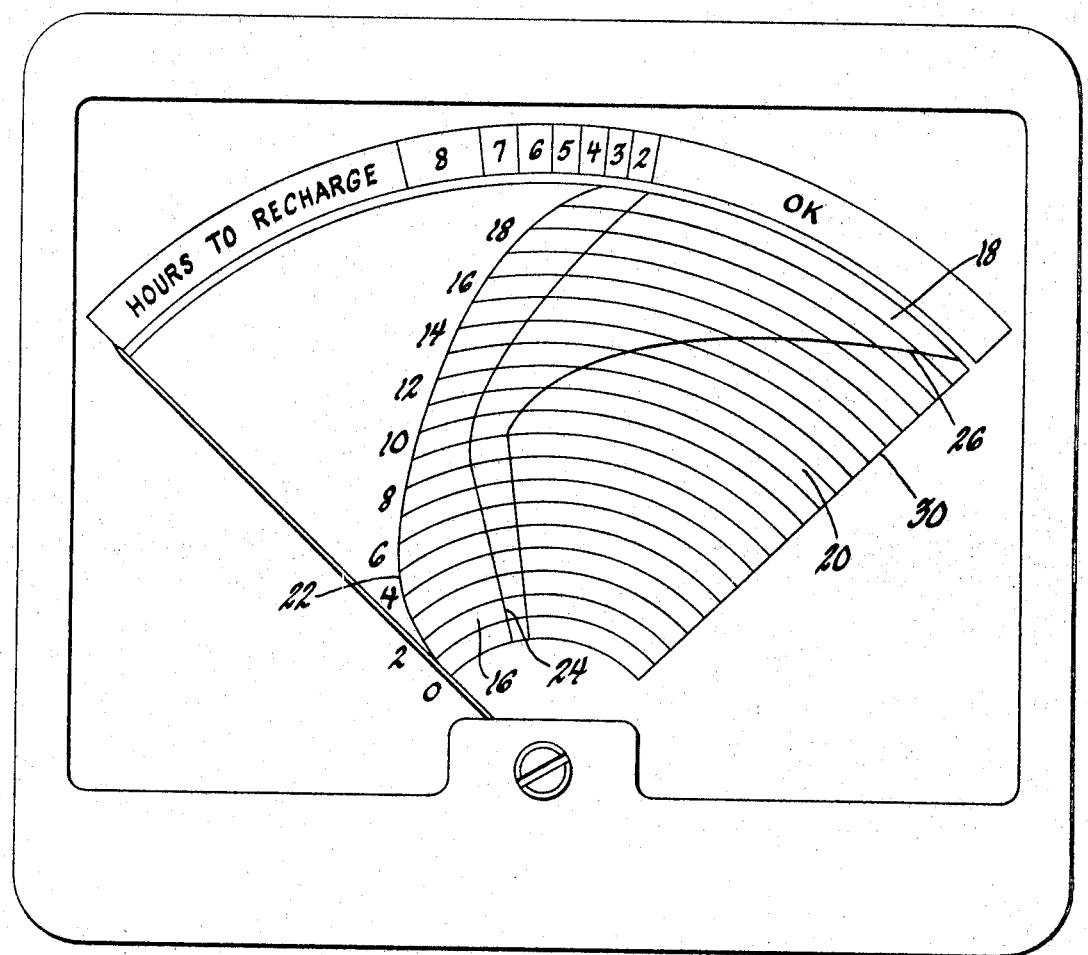
FIGURE 2 illustrates the face of a voltmeter which is calibrated to indicate good and bad batteries when used in the method and system of this invention.

With this experimental data, I have devised a method and apparatus for testing batteries which will determine which of the batteries have open circuit voltages that fall within lines 10 and 12 and which is greater than 80 percent accurate. This tester includes the elements shown in FIGURE 3 and includes an expanded scale voltmeter shown in FIGURE 2. The voltmeter 14 covers the range of eight to sixteen volts and has a fixed face that is provided with a plurality of circumferentially extending scale lines and an index line 22 as shown in FIGURE 2. In addition, the face of the voltmeter has certain discrete areas 16, 18 and 20. The area 16 is defined by index line 22 and line 24 while the area 18 is defined by lines 24 and 26. The area 20 is defined by lines 26 and 30. The areas 16 and 20 can be colored red to indicate a defective battery while the area 18 can be colored green to indicate a good battery. The index line 22 and lines 24 and 26 are placed on the voltmeter face in accordance with the data experimentally determined and shown in FIGURE 1. It will be observed that these lines are not straight lines or radial lines but are placed on the voltmeter face in accordance with the data of FIGURE 1. As is apparent from FIGURE 2 the index line 22 will indicate an open circuit voltage of the battery at a point where the pointer of the voltmeter crosses this line. The line 24 on the face of the voltmeter corresponds to line 12 of the data of FIGURE 1 while the line 26 corresponds to line 10 of the data of FIGURE 1. These lines on the voltmeter face are displaced from each other in accordance with the data of FIGURE 1. This is done by laying out the proper circumferential spacing between the lines in accordance with the voltage data of FIGURE 1 since the length of the circumferential lines are proportional to voltage.

The circumferential scale lines on the voltmeter face must be identified by suitable indicia such as the numbers 0–18 as shown in FIGURE 2 but could also be identified by other indicia such as letters.

The face of the voltmeter also includes indicia indicating the number of hours required to recharge the battery when it is found to be in good condition. This part of the voltmeter face is traversed by the voltmeter pointer as is more fully described hereinafter.

Referring now to FIGURE 3, a schematic circuit diagram of the testing circuit for energizing the voltmeter 14 is illustrated. The testing circuit of FIGURE 3 includes power input lines 32 and 34 which are connected with a plug 36 that is adapted to be connected with a suitable source of alternating current. The line 32 is connected to one side of the primary winding of a step down transformer 40. The line 34 is connected with the movable contact 42 of a manually operable switch 44. The manually operable switch 44 has fixed contacts 46 and 48, the contact 46 being connected with one side of primary winding 38.

The secondary winding 50 of the transformer 40 is center tapped and is connected with diodes 54 and 52 to form a single phase, full-wave rectifier that supplies direct current to lines 56 and 58. The line 56 is connected with a conductor 60 through a fuse 62. The lines 58 and 60 are connected with the battery 63 to be tested although the system of FIGURE 3 also provides a system for charging the battery.

The electrical system of FIGURE 3 includes a switch 64 which is of a manually actuated time delay type. This switch could take a wide variety of forms but must be of a type where it can be manually closed and where it automatically opens after a predetermined time, for example, fifteen seconds. This switch can also be of a known commercially available type which produces a buzzing noise once it is manually closed and which ceases to buzz a predetermined time after it opens. As an example, the switch 64 can open fifteen seconds after it is closed but it is preferred that some signal be present after the switch opens and in such a case, the buzzing noise may occur for a period of twenty seconds or in other words, continues for five seconds after the switch opens. It will, of course, be appreciated that other switching and signalling devices could be used as long as the switch 64 can be manually closed and opens after a predetermined time delay following which there is another time delay and then a signal or termination of an existing signal. The purpose of this signal will be more fully described hereinafter.

The switch 64 is connected in series with a relay coil 66 which controls relay switch contact 68. The contact 68 is normally open but when the switch 64 is closed by a manual operation of the operator, the relay coil 66 is energized across conductors 56 and 58 to cause the contact 68 to close.

The contact 68 is connected in series with a resistor 70. Thus, whenever the contact 68 is closed, the resistor 70 will be connected across the conductors 58 and 60 and will also be connected across the battery.

The direct current voltmeter 14 is connected across conductors 58 and 60 via conductor 72, adjustable resistor 74 and a fixed resistor 76. It therefore is seen that whenever a voltage is developed across conductors 58 and 60, it will be measured by the voltmeter 14.

The electrical system of FIGURE 3 includes a timer motor 78 which drives contacts 80 and 82. The contact 80 cooperates with fixed contacts 84 and 86 while the contact 82 cooperates with a fixed contact 88. The contact 88 is connected with a junction 90 and this junction is connected with conductor 32 via a conductor 92. A signal lamp 94 is connected between fixed timer contact 84 and the junction 90. A push button switch 96 is connected between one side of the timer motor 78 and the junction 90. The movable contact 82 of the timer is connected with conductor 98. The movable contact 80 of the timer is connected with junction 100 and this junction is connected to one side of the timer motor 78 via lead 102 and to contact 48 via lead 104.

The method and apparatus for testing a storage battery will now be described. When it is desired to test a storage battery, the battery 63 is connected across conductors 58 and 60 with the positive terminal being connected to conductor 60. The switch 44 is set in its test position where contact 42 engages contact 48. Assuming that the plug 36 is connected to a source of alternating current, the switch 64 is manually closed by the person testing the battery. When switch 64 closes, the relay coil 66 will be energized across conductors 56 and 58 which will cause the relay contact 68 to close. With contacts 68 closed, the battery will now discharge through conductor 60, through resistor 70, through closed switch 68, and then through conductor 58 to the opposite side of the battery under test.

The battery discharges through the resistor 70 for approximately fifteen seconds since the time delay switch 64 holds the contact 64 closed for fifteen seconds. During this time, the device 64 provides an audible buzzing noise. This discharge rate can be approximately fifty amperes. When the switch contacts 64 open, the battery no longer discharges and the audible signal provided by the switch 64 continues until five seconds after the switch 64 opens. This gives the battery a five second waiting period which is necessary to stabilize its open circuit voltage.

When the device 64 stops its audible signal, the person testing the battery reads the voltmeter 14 and notes where the pointer of the voltmeter crosses index line 22 on the face of the voltmeter. Let it be assumed that the pointer crosses the index line 22 at scale number 14.

Following this, the operator manually closes the push button switch 96. When switch 96 closes, the timer motor 78 is energized via line 32, line 92, junction 90, the closed switch 96, conductor 98, timer motor 78, conductors 102 and 104, switch contacts 42 and 48 and conductor 34 to the opposite side of the source of alternating current. The operator holds the push button switch 96 closed until the signal lamp goes out. This happens as the timer motor advances which causes the contact 82 to engage contact 88 before contact 80 leaves contact 84. The timer is arranged such that the lamp 94 goes off approximately five seconds after the push button 96 is depressed and at the time contact 80 leaves contact 84. It will be appreciated that when timer contact 82 engages timer contact 88, a holding circuit for the timer motor 78 is completed.

As the timer motor 78 advances, the contact 80 shifts into engagement with contact 86 just after the contact 82 engages contact 88. When contact 80 engages contact 86, a circuit is completed for the primary 38 which can be traced from conductor 32, through primary 38, through conductor 47, through closed timer contacts 86 and 80, through junction 100, through conductor 104, through closed selector switch contacts 48 and 42, and then to conductor 34. Since the primary winding 38 is now connected across the power source, the battery will be charged from the rectifier circuit with direct current that appears across conductors 60 and 58. The battery will continue to be charged as long as timer contacts 80 and 86 are closed. The time that the battery is charged is set by movement of the timer and can be approximately 45 seconds.

At the completion of the charging cycle for the battery, the timer contact 80 will leave contact 86 and eventually move into engagement with contact 84. The contact 82 will leave contact 88 to break the circuit for the timer motor 78. When the timer contact 80 engages timer contact 84, a circuit is complete for the signal lamp 94 and it turns on. There is a short time delay between the end of the charging cycle and the time that the light 94 turns on to permit the open circuit voltage of the battery to stabilize. As an example, the battery can be charged for 45 seconds with a fifteen second time delay between the end of the charging cycle and the time that the light 94 turns on.

When the operator of the tester sees that the light 94 is turned on, he reads the voltmeter 14 remembering the scale number which was crossed by the pointer after the discharge cycle. We have assumed that this scale number was number 14 and the operator now visually determines where the pointer of the voltmeter crosses the number 14 scale line. If the pointer crosses the scale line 14 in area 18, the battery is in good condition. If the pointer crosses scale line 14 in either area 16 or 20, the battery is defective.

When the operator observes where the pointer crosses the scale line, he also can observe where the pointer crosses the area indicating the number of hours to recharge the battery where the battery as indicated by the test is a good battery.

The testing circuit of FIGURE 3 in addition to being capable of testing a battery can also be used to charge a battery when the battery is run down. The charge position of the selector switch 44 is where the contactor 42 engages contact 46. The test position is where contact 42 engages contact 48 and the off position is where contact 42 is disengaged from both contacts 46 and 48.

From the foregoing, it can be seen that a battery tester has been provided which uses the difference in open circuit voltages after discharge and charge as a measure of determining whether or not the battery is defective. The tester is capable of indicating a wide variety of defects by comparing open circuit voltages. These include negative plate failures, shorts, poor lead burns, positive plate grid oxidation and failure to add water to the battery during service. Where the failure is a negative plate failure or a short, the difference in open circuit voltage is higher than in the case of the other failures mentioned above. In other words, with a negative plate failure, the pointer of the voltmeter will end up in area 20 during the test procedure.

While the embodiments of the present invention as herein disclosed constitute a preferred form, it is to be understood that other forms might be adopted.

What is claimed is as follows:

1. A method of testing storage batteries, the steps comprising, discharging all of the cells of said battery simultaneously by electrically connecting a conductive circuit across the positive and negative terminals of said battery for a predetermined length of time, removing said conductive circuit from across said terminals of said battery, measuring the open circuit voltage of said battery, connecting said positive and negative terminals of said battery with a source of battery charging current, charging said battery for a predetermined length of time, measuring the open circuit voltage of said battery following said charging of said battery, and comparing the difference in open circuit voltages with open circuit voltage data indicative of good and defective batteries as a function of open circuit voltages after discharge and charge to thereby determine whether or not the battery is defective.

2. A method of testing storage batteries, the steps comprising, discharging all of the cells of said battery simultaneously by electrically connecting a conductive circuit across the positive and negative terminals of said battery for a predetermined length of time, disconnecting said conductive circuit from across the positive and negative terminals of said battery, permitting said battery to stabilize for a short period of time, measuring the open circuit voltage of said battery, connecting said positive and negative terminals of said battery with a source of battery charging current, charging said battery for a predetermined length of time, permitting said battery to stabilize for a predetermined length of time following the charging of said battery, measuring the open circuit voltage of said battery, and comparing the difference in open circuit voltages with open circuit voltage data indicative of good and defective batteries as a function of open circuit voltage after discharge and charge to thereby determine whether or not the battery is defective.

3. A method of testing storage batteries, the steps comprising, connecting the positive and negative terminals of a storage battery with an electrical load and discharging said storage battery through said electrical load for a predetermined length of time, disconnecting said electrical load from the positive and negative terminals of said storage battery, measuring the open circuit voltage of said storage battery by connecting a voltage responsive measuring device across the terminals of said battery after it has been disconnected from said electrical load, connecting the terminals of said storage battery with a source of direct current, charging said storage battery from said source of direct current for a predetermined length of time, disconnecting said source of direct current from said battery, connecting a voltage responsive measuring device across the terminals of said storage battery and measuring the open circuit voltage of said storage battery after it has been disconnected from said source of direct current charging current, and comparing the difference in open circuit voltages with open circuit voltage data indicative of good and defective batteries as a function of open circuit voltage after discharge and charge to thereby determine whether or not the battery is defective.

4. A testing device for testing storage batteries comprising, first and second conductors adapted to be connected with the terminals of a storage battery to be tested, an electrical load, a first switching device for connecting said electrical load across said conductors of said tester, timing means for maintaining said first switching means closed for a predetermined length of time whereby said battery discharges through said electrical load for the length of time established by said timing means, a battery charging circuit having AC input terminals which are adapted to be connected with a source of alternating current, transformer and rectifier means connected with said AC input terminals having direct current output terminals, means connecting said direct current output terminals of said battery charging circuit with said conductors of said tester whereby said battery charging circuit is operable to charge said battery, second switching means controlling the charging of said battery from said battery charging circuit, timing means controlling the operation of said second switching means, and a voltmeter connected across said conductors of said tester for determining the open circuit voltage of said storage battery after it is discharged through said electrical load and after it is charged by said battery charging circuit, said voltmeter having a pointer which moves across the face of said voltmeter, said face of said voltmeter having a plurality of radially spaced circumferentially extending lines, and at least two voltage limit lines extending generally radially across said circumferentially extending lines, said two lines being placed on said voltmeter in accordance with data determined from testing a number of storage batteries by checking the open circuit voltages of said storage batteries following a discharging and a charging cycle.

5. A battery tester comprising, first and second conductors adapted to be connected across the terminals of a storage battery to be tested, an electrical load, a first switching device connecting said electrical load across said first and second conductors, timing means for determining the time that said first switching means is maintained in a closed position, a battery charging circuit including a transformer having a primary winding and a secondary winding, AC input conductors adapted to be connected with a source of alternating current connected with said primary winding, rectifier means connected with said secondary winding having direct current output terminals connected with said first and second conductors, second switching means controlling the energization of said first and second conductors from said battery charging circuit, timing means connected with said second switching means for controlling the time period that said battery charging circuit supplies charging current to said first and second conductors, and a voltmeter connected across said first and second conductors, said voltmeter including a face and a pointer which moves across said face, said face having a plurality of radially spaced circumferentially extending lines, and first, second and third indicating lines extending across said circumferentially extending lines, said first line providing an indication of said storage battery following a discharge of said storage battery at a point where said pointer crosses said first line and one of said circumferentially extending lines, said second and third lines providing voltage limits for indicating the open circuit voltage of said storage battery following a charging of said storage battery.

6. A testing device for testing storage batteries comprising, first and second conductors adapted to be connected with a battery to be tested, a source of direct current battery charging current, said source of battery charging current including AC input terminals adapted to be connected with a source of alternating current and direct current output terminals connected with said first and second conductor means, an electrical load, first switch means for electrically connecting said electrical load across said first and second conductors, timer means for controlling the operation of said first switch means, second switch means controlling the energization of said first and second conductors from said source of battery charging current, timer means for controlling the operation of said second switch means, and a voltmeter connected across said first and second conductors, said voltmeter having a face and a pointer which moves circumferentially across said face as determined by the voltage applied to said voltmeter, a plurality of radially spaced circumferentially extending lines on said face of said voltmeter, first, second and third indicating lines extending across said circumferentially extending lines, said first line providing an indication of the open circuit voltage of said battery following a discharge of said battery and at a point where said pointer crosses said first line and one of said circumferentially extending lines, said second and third indicating lines providing voltage limits for said tester when said voltmeter is connected across said battery to indicate the open circuit voltage of said battery following a charging of said battery, said second and third lines being circumferentially spaced from said first line by an amount determined by testing a number of storage batteries by discharging and charging the batteries and checking the difference in open circuit voltages of said batteries.

References Cited

UNITED STATES PATENTS

| | | | |
|---|---|---|---|
| 1,922,792 | 8/1933 | Cain | 324—29.5 |
| 2,096,131 | 10/1937 | Oestermeyer | 324—29.5 XR |
| 2,254,846 | 9/1941 | Heyer | 324—29.5 |
| 2,352,499 | 6/1944 | Sears | 324—29.5 |
| 2,632,793 | 3/1953 | Linn | 324—29.5 |
| 2,864,055 | 12/1958 | Kordesch et al. | 324—29.5 |

RUDOLPH V. ROLINEC, *Primary Examiner.*

C. F. ROBERTS, *Assistant Examiner.*